(12) United States Patent
Taylor et al.

(10) Patent No.: US 6,624,954 B2
(45) Date of Patent: Sep. 23, 2003

(54) LENS MOUNTING APPARATUS

(75) Inventors: Mark Taylor, Seattle, WA (US); Vance A. Prather, Fremont, CA (US); Mark J. Johnson, Oakland, CA (US); Ali Moayer, Castro Valley, CA (US)

(73) Assignee: Logitech Europe S.A. (CH)

( * ) Notice: Subject to any disclaimer, the term of this patent is extended or adjusted under 35 U.S.C. 154(b) by 125 days.

(21) Appl. No.: 09/883,153

(22) Filed: Jun. 15, 2001

(65) Prior Publication Data

US 2002/0191309 A1 Dec. 19, 2002

(51) Int. Cl.[7] ................................................. G02B 7/02
(52) U.S. Cl. ........................ 359/819; 359/811; 359/822; 359/825; 359/826
(58) Field of Search ................................. 359/819, 811, 359/822, 823, 825, 826, 829

(56) References Cited

U.S. PATENT DOCUMENTS 6,907,026 * 8/2000 Tsai ............................ 250/239
6,483,101 B1 * 11/2002 Webster ........................ 250/239

* cited by examiner

Primary Examiner—Jordan M. Schwartz
Assistant Examiner—Timothy J Thompson

(74) Attorney, Agent, or Firm—Townsend and Townsend and Crew LLP

(57) ABSTRACT

Embodiments of the present invention provide a lens mounting apparatus for mounting a lens to a substrate having a sensor in a sensor housing mounted on the substrate. The apparatus comprises a lens mount member including a lens mount body coupled with the lens housing. The lens mount body includes a locating element configured to register the lens mount body to the sensor housing mounted on the substrate. The lens mount member includes a flexible mounting element configured to be attached to the substrate and permit movement of the lens mount body toward and away from the sensor housing. A focus ring includes a slip ring portion coupled with the coupling surface of the lens housing. The slip ring portion includes a plurality of teeth disposed on a flexible slip ring support and engaged with the grooves of the coupling surface to turn the lens housing to adjust the position of the lens in an axial direction relative to the lens mount member, between a fully extended position where the lens is farthest from the lens mount member and a fully retracted position where the lens is closest to the lens mount member. The flexible slip ring support permits the teeth to slip out of and ratchet with the grooves of the coupling surface when the focus ring is rotated in a direction to move the lens toward the lens mount member after the lens has reached the fully retracted position. The focus ring is movable in the axial direction relative to the lens mount member with the teeth of the slip ring portion of the focus ring engaged with the grooves of the coupling surface of the lens housing.

20 Claims, 5 Drawing Sheets

LENS MOUNTING APPARATUS

BACKGROUND OF THE INVENTION

The present invention relates generally to cameras and, more particularly, to a system for mounting a camera lens.

The size of the image sensor array in video cameras such as web cameras has been shrinking due to improvements in technology. This leads to a decrease in the size of the sensor die on which the sensor is mounted. Based on optics principles, to maintain a field of view the lens must be moved closer to the image sensor die as the die size is reduced. In a typical lens mounting system, the user can adjust the relative position of the lens with respect to the sensor die by turning a focus ring. The same relative positioning is used for focusing and zooming operations. A problem arises that the user may bring the lens assembly in contact with the sensor die and unknowingly push the lens assembly against the sensor die, which may lead to the cracking of the lens or damage to the image sensor or other components of the lens mounting apparatus such as the pins connecting the image sensor to the substrate or PCB.

BRIEF SUMMARY OF THE INVENTION

Embodiments of the present invention provide a lens mounting apparatus which allows the user to bring the lens assembly into full contact with the sensor or housing. A focus ring is typically provided for moving the lens assembly relative to the sensor. Once the lens assembly is in full contact with the sensor, further turning of the focus ring will cause the focus ring to slip relative to and ratchet with the lens housing, in a manner similar to a torque wrench, thus avoiding the application of excessive forces on and causing damage to the lens and other components of the lens mounting apparatus. Furthermore, a locating device is used to register the lens mounting apparatus to the sensor package. This is desirable because the decrease in size of the sensor reduces the allowable alignment tolerance between the lens and the sensor die from about 0.7 mm to less than 0.3 mm.

In accordance with an aspect of the present invention, a lens mounting apparatus for mounting a lens to a substrate having a sensor in a sensor housing mounted on the substrate comprises a lens mount member including a lens mount body coupled with the lens. The lens mount body includes a locating element configured to register the lens mount body to the sensor housing mounted on the substrate. The lens mount member includes a flexible mounting element configured to be attached to the substrate and permit movement of the lens mount body toward and away from the sensor housing.

In some embodiments, the locating element comprises a plurality of locating ribs configured to align the lens mount body with the sensor housing. The lens mount body is configured not to make contact with the substrate. The flexible mounting element comprises a pair of flexible mounting straps disposed on opposite sides of the lens mount body. The lens mount member is configured to maintain a gap between the sensor and the lens when the lens is in focus. The lens mount member includes a threaded portion to be threadingly coupled with the lens to permit adjustment of a position of the lens relative to the sensor.

In accordance with another aspect of the invention, a lens device comprises a lens disposed in a lens housing. The lens housing includes a coupling surface having a plurality of grooves. A lens mount member is threadingly coupled with the lens housing to permit adjustment of a position of the lens housing relative to the lens mount member. A focus ring includes a slip ring portion coupled with the coupling surface of the lens housing. The slip ring portion includes a plurality of teeth disposed on a flexible slip ring support and engaged with the grooves of the coupling surface to turn the lens housing to adjust the position of the lens in an axial direction relative to the lens mount member, between a fully extended position where the lens is farthest from the lens mount member and a fully retracted position where the lens is closest to the lens mount member. The flexible slip ring support permits the teeth to slip out of and ratchet with the grooves of the coupling surface when the focus ring is rotated in a direction to move the lens toward the lens mount member after the lens has reached the fully retracted position.

In some embodiments, the slip ring portion includes a pair of teeth disposed on opposite sides of the lens housing. The plurality of grooves of the coupling surface are outward facing grooves disposed on an external surface of the lens housing. The slip ring portion includes a plurality of inward facing teeth. The focus ring is movable in the axial direction toward and away from the lens mount member with the teeth of the slip ring portion of the focus ring engaged with the grooves of the coupling surface of the lens housing.

DESCRIPTION OF THE SPECIFIC EMBODIMENTS

Figure 1:
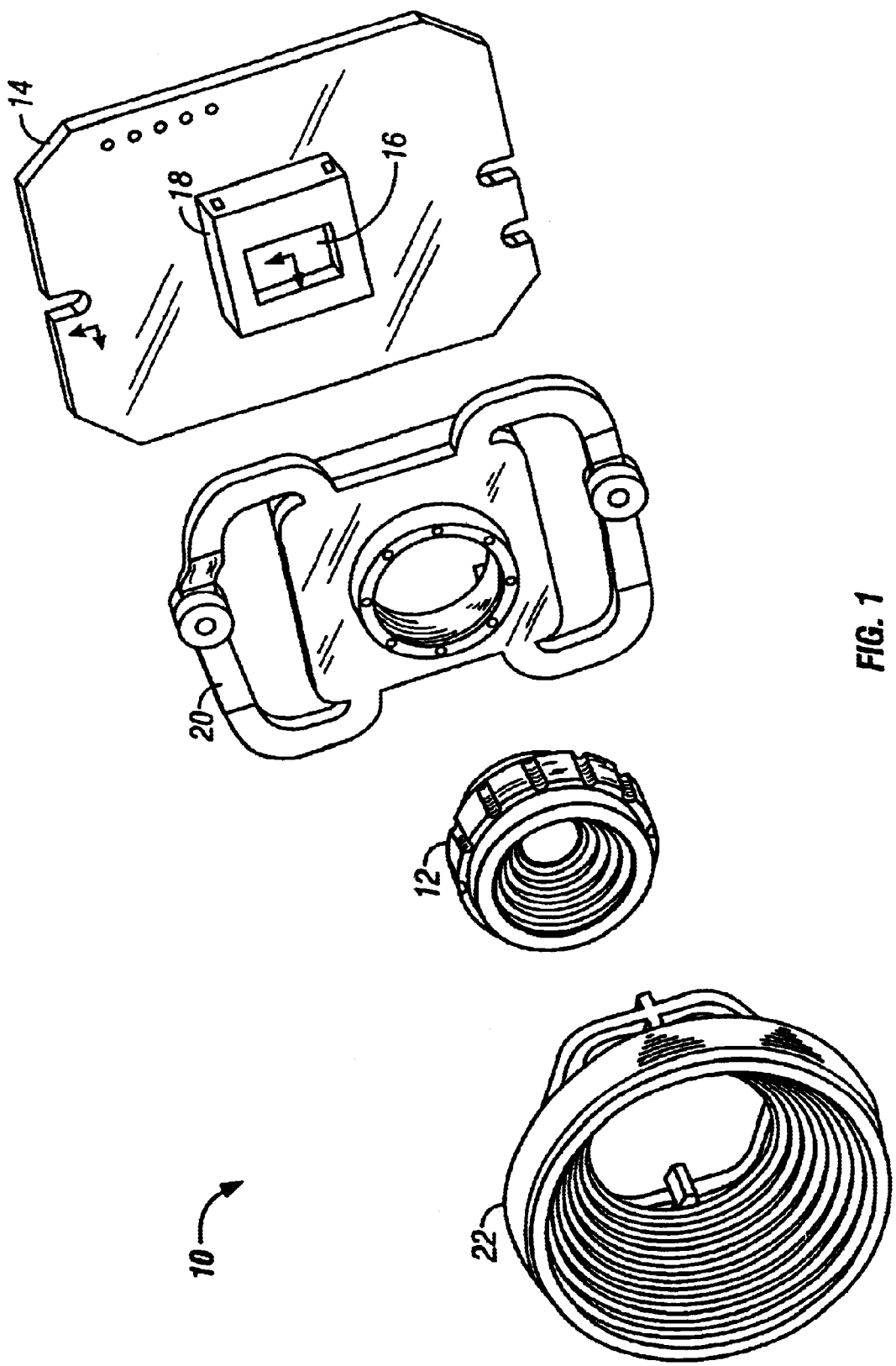
FIG. 1 is an exploded perspective view of a lens mounting system for mounting a lens to a substrate according to an embodiment of the present invention.
Figure 2:
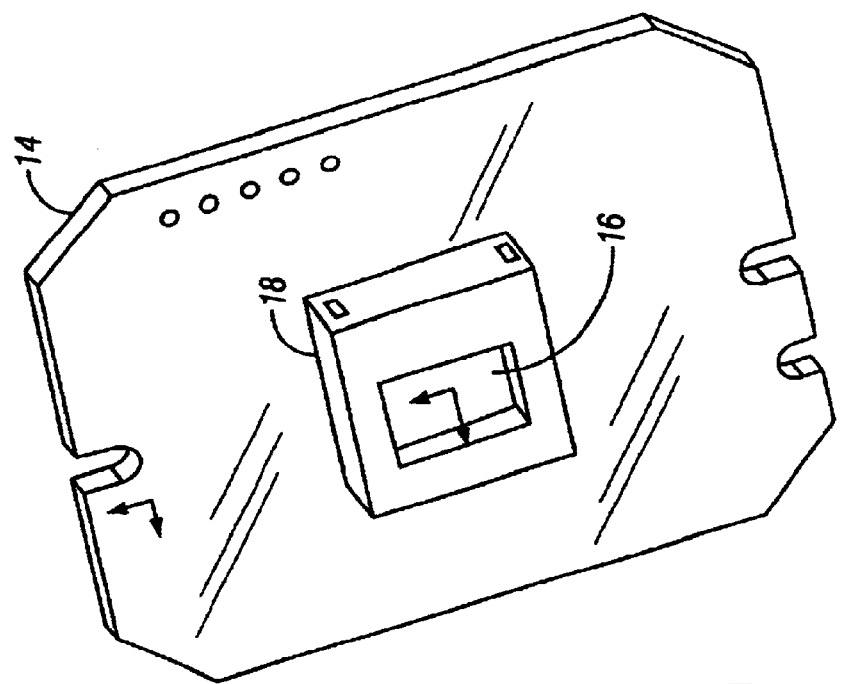
FIG. 2 is an exploded perspective view of the lens mount member and PCB in the lens mounting system of FIG. 1.
Figure 2:
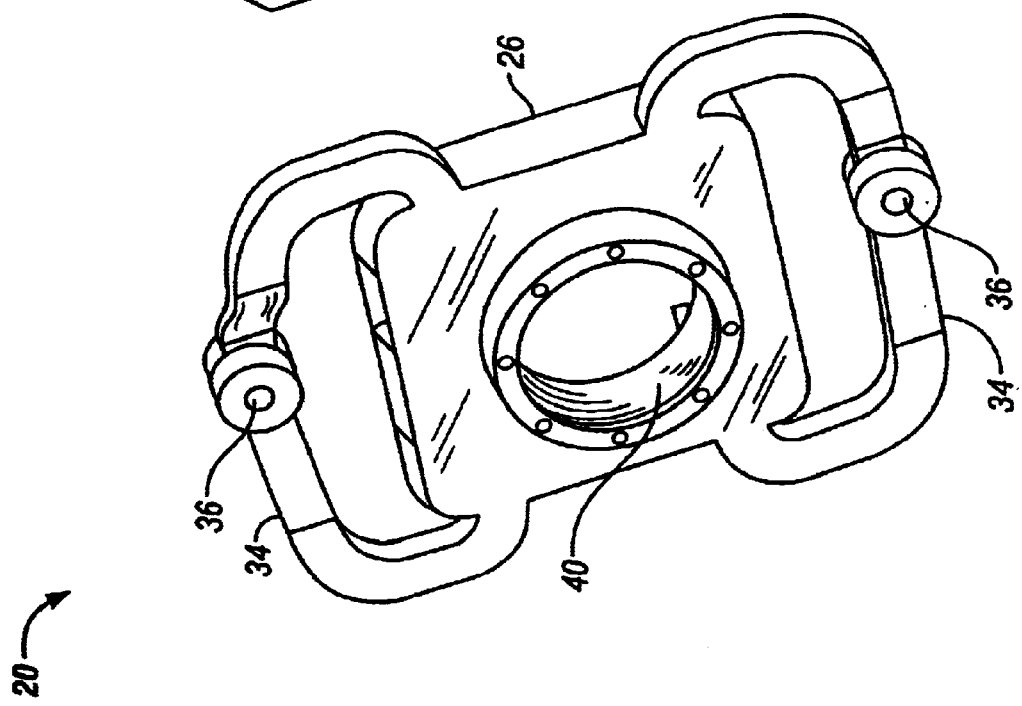
Figure 3:
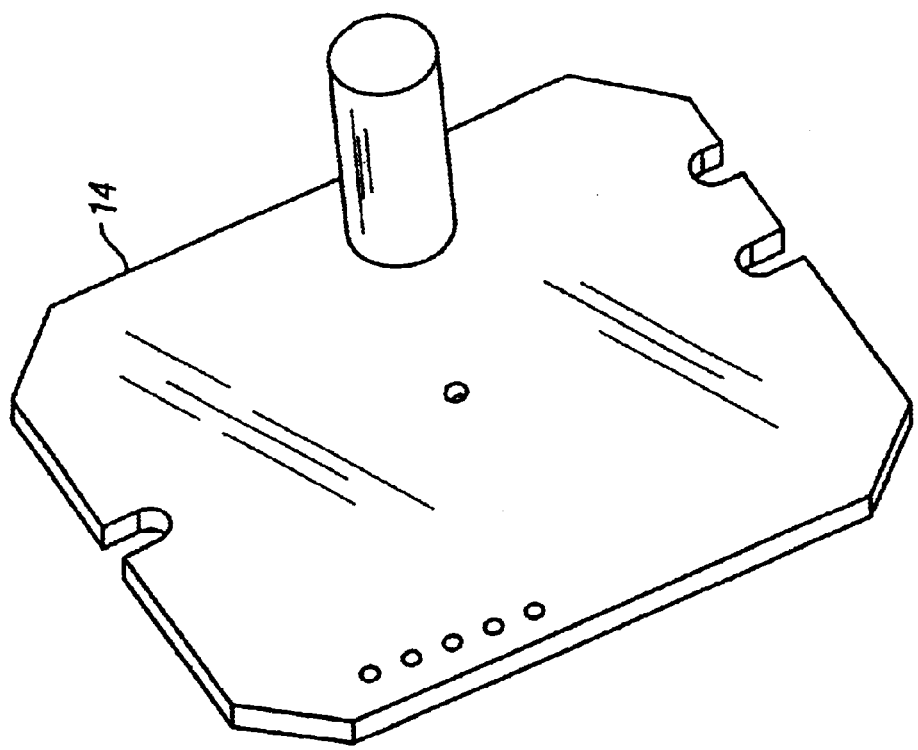
FIG. 3 is another exploded perspective view of the lens mount member and PCB of FIG. 2.
Figure 3:
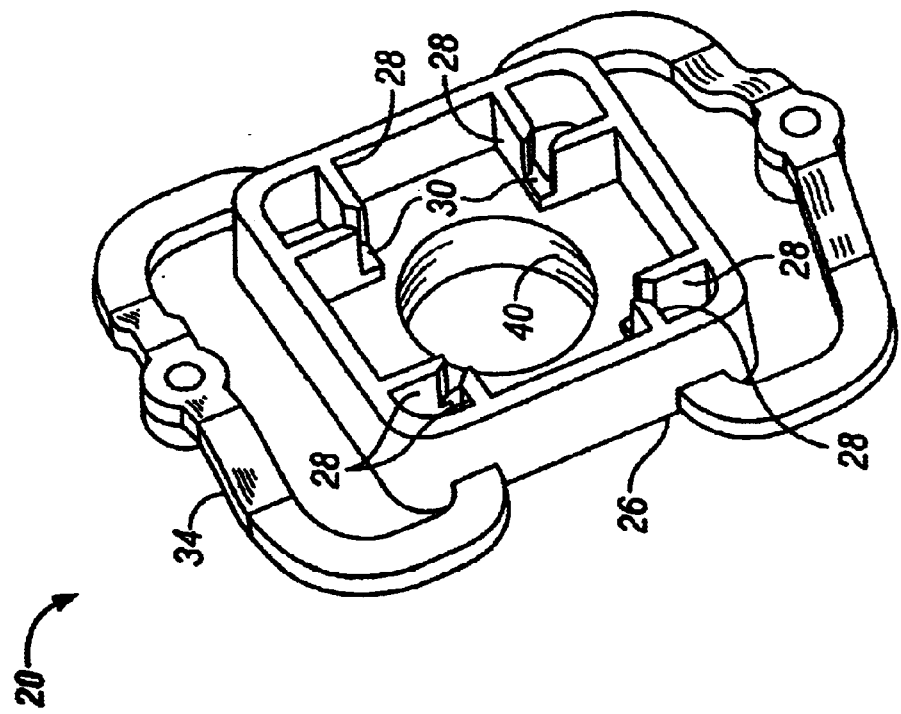
Figure 4:
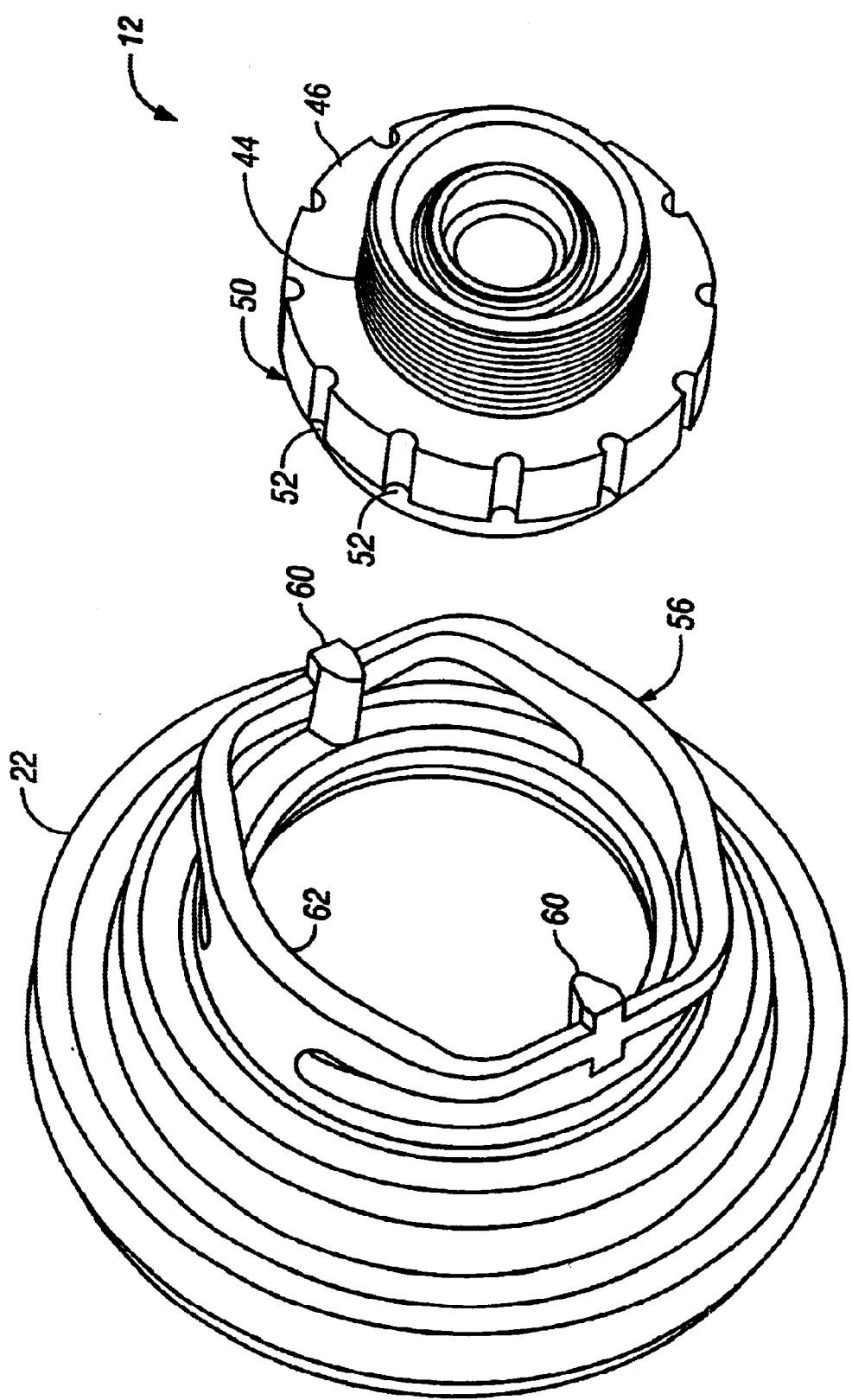
FIG. 4 is an exploded perspective view of the lens and focus ring in the lens mounting system of FIG. 1.

FIG. 1 illustrates an embodiment of the lens mounting system 10 for mounting a lens 12 to a substrate 14 which is typically a PCB. A sensor 16 is disposed on a sensor die or housing 18 mounted to the substrate 14. A lens mount member 20 couples the lens 12 to the substrate 14. A focus ring 22 is coupled with the lens 12 for adjusting the focus of the lens 12. Features of the lens mount member 20 are shown in FIGS. 2 and 3, while FIG. 4 shows the focus ring 22 in greater detail. The assembled lens mounting system 10 is illustrated in FIG. 5.

As shown in FIGS. 2 and 3, the lens mount member 20 includes a lens mount body 26 which is coupled with the sensor housing 18 and the lens 12. As best seen in FIG. 3, the lens mount body 26 has a plurality of locating elements 28 configured to register the lens mount body 26 to the sensor housing 18. In the embodiment shown, the locating elements are locating ribs 28 which align the lens mount body 26 with the sensor housing 18. The ribs 28 are disposed around an outer edge of the sensor housing 18. FIG. 3 shows four pairs of ribs 28 which are disposed near the four corners of the rectangular sensor housing 18. Each pair of ribs 28 include a slot 30 for receiving a portion of the sensor housing 18. The depth of the slots 30 is sufficiently shallow that when the sensor housing 18 is fully received into the slots 30, the lens mount housing 26 does not make contact with the substrate 14. This is illustrated by the spacing 32 between the lens mount housing 26 and the substrate 14 in FIG. 5. The spacing 32 may typically be about 0.9 mm. Of course, the sensor housing may have other shapes and different arrangements of locating elements may be employed in other embodiments.

The lens mount member 20 further includes a flexible mounting mechanism to resiliently attach the lens mount member 20 to the substrate 14 and to permit movement of the lens mount body 26 toward and away from the sensor housing 18. In this particular embodiment, the flexible mounting mechanism includes a pair of flexible mounting straps 34 disposed on opposite sides of the lens mount body 26. The straps 34 include apertures 36 through which fasteners extend to fasten the straps 34 to the substrate 14 at locations away from the lens mount body 26 and the sensor housing 18. The flexible straps 34 permit movement of the lens mount body 26 relative to the sensor housing 18. The lens mount member 20 thus floats on the sensor housing 18. In other embodiments, the flexible straps 34 may be replaced by other flexible members having other shapes and configurations, such as spring-like structures.

Figure 5:
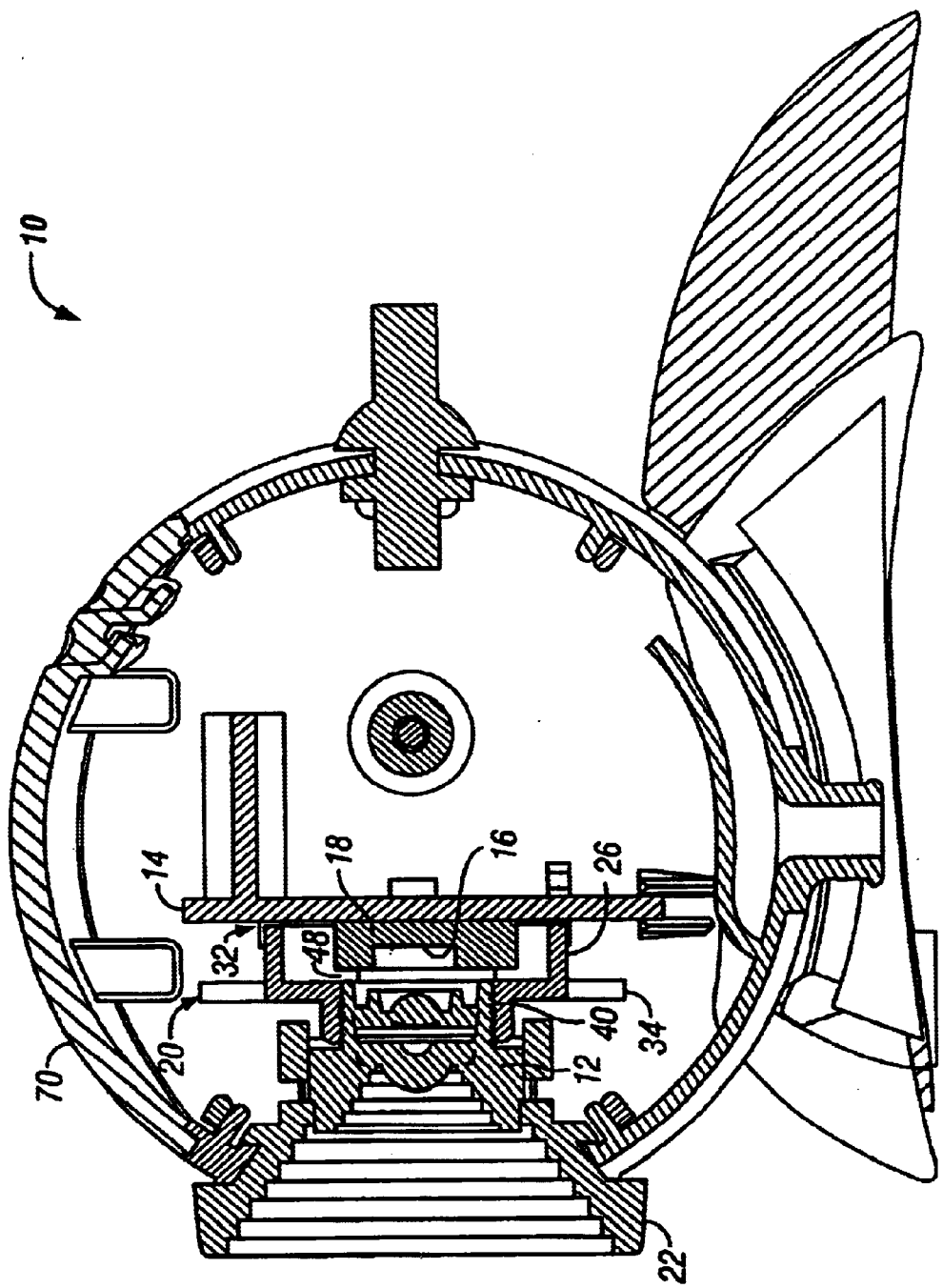
FIG. 5 is a cross-sectional view of an assembled lens mounting system of FIG. 1.

The lens mount body 26 includes a threaded aperture 40 (FIGS. 2 and 3) which is threadingly coupled with a threaded portion 44 of the lens housing 46 of the lens 12 (FIG. 4), as best seen in the assembled view of FIG. 5. The threaded engagement allows positional adjustment of the lens 12 relative to the sensor 16 in an axial direction between a fully extended position, where the lens 12 is farthest from the lens mount member 20 and the sensor 16, and a fully retracted position, where the lens 12 is closest to the lens mount member 20 and the sensor 16. FIG. 5 shows the lens 12 in the fully retracted position closest to the sensor 16 after fully threading the two members together. In that position, the lens mount body 26 is configured to maintain a gap 48 from the sensor 16 and housing 18 when the lens 12 is in focus so that the lens 12 does not make contact with the sensor 16 and housing 18. The flexible straps 34 prevent damage even when the lens 12 comes into contact with the sensor 16.

As shown in FIG. 4, the lens housing 46 includes a coupling surface 50 having a plurality of grooves 52. The grooves 52 shown are outward facing grooves disposed on the external coupling surface 50 of the lens housing 46. The focus ring 22 includes a slip ring portion 56 coupled with the coupling surface 50 of the lens housing 46. The slip ring portion 56 includes a plurality of teeth 60 disposed on a flexible slip ring support 62. FIG. 4 shows inward facing teeth 60. The teeth 60 are engaged with the grooves 52 of the coupling surface 50 of the lens housing 46 to turn the lens housing 46 to adjust the position of the lens 12 threadingly in the axial direction relative to the lens mount member 20 between the fully extended position and the fully retracted position. The flexible slip ring support 62 permits the teeth 60 to slip out of and ratchet with the grooves 52 of the coupling surface 50 of the lens housing 46 when the focus ring 22 is rotated in a direction to move the lens 12 toward the lens mount member 20 and the sensor 16, after the lens 12 has reached the fully retracted position. In this way, the lens 12 will not advance any further to cause damage to the sensor 16 or to the threaded coupling between the lens 12 and the lens mount body 26. FIG. 4 shows a pair of teeth 60 disposed opposite one another. In other embodiments, more teeth 60 may be provided. There are typically an even number of teeth which are desirably uniformly distributed around the flexible slip ring support 62. The number of grooves 52 is typically greater than the number of teeth 60.

In the embodiment shown in FIG. 4, the grooves 52 and teeth 60 are oriented in the axial direction. In this way, the focus ring 22 is movable in the axial direction toward and away from the lens mount member 20 when the teeth 60 and grooves 52 are engaged with each other, so that the focus ring 22 floats on the lens 12. This facilitates movement of the lens 12 in the axial direction while the slip ring 22 stays fixed in the axial direction. As shown in FIG. 5, the slip ring 22 is connected with a camera housing 70 to stay fixed in the axial direction and be rotatable to turn the lens 12. Because the focus ring 22 floats on the lens 12, it will not transfer a force or load to the lens 12 in case of an accident such as the dropping of the camera. This protects the lens 12 from damage due to load transfer.

The lens 12 moves toward the sensor 16 when the slip ring 22 turns in the clockwise direction, and moves away from the sensor 16 when the slip ring 22 turns in the counter-clockwise direction. In the fully retracted position, the teeth 60 of the slip ring 22 slip out of and ratchet with the grooves 52 of the lens housing 46. In some embodiments, the teeth 60 may be angled or slanted in the counter-clockwise direction to make them slip more readily when being turned in the clockwise direction after reaching the fully retracted position. The angled teeth 60 will also provide better gripping when the slip ring 22 is turned in the counter-clockwise direction to move the lens from the fully retracted position to the fully extended position away from the sensor 16.

In the embodiment shown, the lens 12 is decoupled from the lens mount member 20 and the focus ring 22. As a result, the lens 12 may be replaced relatively easily without replacing the other components. In some embodiments, the dimensions of the lens housing of the replacement lens remain the same so as to provide the same engagement with the focus ring 22 and the lens mount member 20. In other embodiments, the replacement lens results in a shorter or taller lens assembly.

The above-described arrangements of apparatus and methods are merely illustrative of applications of the principles of this invention and many other embodiments and modifications may be made without departing from the spirit and scope of the invention as defined in the claims. For example, the shapes, sizes, and locations of the various components of the lens mounting system may be changed. The locating ribs may be replaced by locating posts or columns. The scope of the invention should, therefore, be determined not with reference to the above description, but instead should be determined with reference to the appended claims along with their full scope of equivalents.

What is claimed is:

1. A lens mounting apparatus for mounting a lens to a substrate having a sensor in a sensor housing mounted on the substrate, the apparatus comprising:

a lens mount member including a lens mount body coupled with the lens, the lens mount body including a locating element configured to register the lens mount body to the sensor housing mounted on the substrate, the lens mount member including a flexible mounting element configured to be attached to the substrate and permit movement of the lens mount body toward and away from the sensor housing.

2. The lens mounting apparatus of claim 1 wherein the locating element comprises a plurality of locating ribs configured to align the lens mount body with the sensor housing.

3. The lens mounting apparatus of claim 2 wherein the plurality of locating ribs are configured to be disposed around an outer edge of the sensor housing.

4. The lens mounting apparatus of claim 1 wherein the lens mount body is configured not to make contact with the substrate.

5. The lens mounting apparatus of claim 1 wherein the flexible mounting element comprises a pair of flexible mounting straps disposed on opposite sides of the lens mount body.

6. The lens mounting apparatus of claim 1 wherein the lens mount member is configured to maintain a gap between the sensor and the lens with the lens in focus.

7. The lens mounting apparatus of claim 1 wherein the lens mount member includes a threaded portion to be threadingly coupled with the lens to permit adjustment of a position of the lens relative to the sensor.

8. A lens device comprising:
   a lens disposed in a lens housing, the lens housing including a coupling surface having a plurality of grooves;
   a lens mount member threadingly coupled with the lens housing to permit adjustment of a position of the lens housing relative to the lens mount member; and
   a focus ring including a slip ring portion coupled with the coupling surface of the lens housing, the slip ring portion including a plurality of teeth disposed on a flexible slip ring support and engaged with the grooves of the coupling surface to turn the lens housing to adjust the position of the lens in an axial direction relative to the lens mount member between a fully extended position where the lens is farthest from the lens mount member and a fully retracted position where the lens is closest to the lens mount member, the flexible slip ring support permitting the teeth to slip out of and ratchet with the grooves of the coupling surface when the focus ring is rotated in a direction to move the lens toward the lens mount member after the lens has reached the fully retracted position.

9. The lens device of claim 8 wherein the slip ring portion includes a pair of teeth disposed on opposite sides of the lens housing.

10. The lens device of claim 8 wherein the plurality of grooves of the coupling surface are outward facing grooves disposed on an external surface of the lens housing, and wherein the slip ring portion includes a plurality of inward facing teeth.

11. The lens device of claim 8 wherein the number of grooves of the coupling surface is greater than the number of teeth of the slip ring portion.

12. The lens device of claim 8 wherein the focus ring is movable in the axial direction toward and away from the lens mount member with the teeth of the slip ring portion of the focus ring engaged with the grooves of the coupling surface of the lens housing.

13. The lens device of claim 12 wherein the grooves and the teeth are oriented in the axial direction.

14. The lens device of claim 8 further comprising a sensor disposed in a sensor housing mounted on a substrate, and means for registering the lens mount member to the sensor housing.

15. The lens device of claim 14 further comprising means for attaching the lens mount member to the substrate to permit movement of the lens mount member relative to the sensor housing in the axial direction.

16. The lens device of claim 8 wherein the teeth are angled away from a direction of rotation of moving the lens toward the lens mount member in the fully retracted position so as to facilitate slipping of the teeth out of the grooves after the lens has reached the fully retracted position.

17. A lens apparatus comprising:
   a substrate;
   a sensor disposed in a sensor housing mounted to the substrate;
   a lens disposed in a lens housing;
   a lens mount member coupled with the lens,
   means for registering the lens mount member to the sensor housing mounted on the substrate; and
   a flexible mounting member for attaching the lens mount member to the substrate to permit movement of the lens mount body toward and away from the sensor housing.

18. The lens apparatus of claim 17 wherein the lens mount member is threadingly coupled with the lens housing to permit adjustment of a position of the lens housing relative to the lens mount member.

19. The lens apparatus of claim 17 wherein the lens mount body maintains a gap between the sensor and the lens and does not make contact with the substrate when the lens is in focus.

20. A lens apparatus comprising:
   a substrate;
   a sensor disposed in a sensor housing mounted to the substrate;
   a lens disposed in a lens housing;
   a lens mount member coupled with the lens,
   means for registering the lens mount member to the sensor housing mounted on the substrate;
   means for attaching the lens mount member to the substrate to permit movement of the lens mount body toward and away from the sensor housing; and
   a focus ring including a slip ring portion coupled with the coupling surface of the lens housing, the slip ring portion including a plurality of teeth disposed on a flexible slip ring support and engaged with the grooves of the coupling surface to turn the lens housing to adjust the position of the lens in an axial direction relative to the lens mount member between a fully extended position where the lens is farthest from the lens mount member and a fully retracted position where the lens is closest to the lens mount member, the flexible slip ring support permitting the teeth to slip out of and ratchet with the grooves of the coupling surface when the focus ring is rotated in a direction to move the lens toward the lens mount member after the lens has reached the frilly retracted position.

* * * * *